Jan. 3, 1928.
F. D. HARDESTY
1,654,806
SNAP FASTENER
Filed Dec. 31, 1921
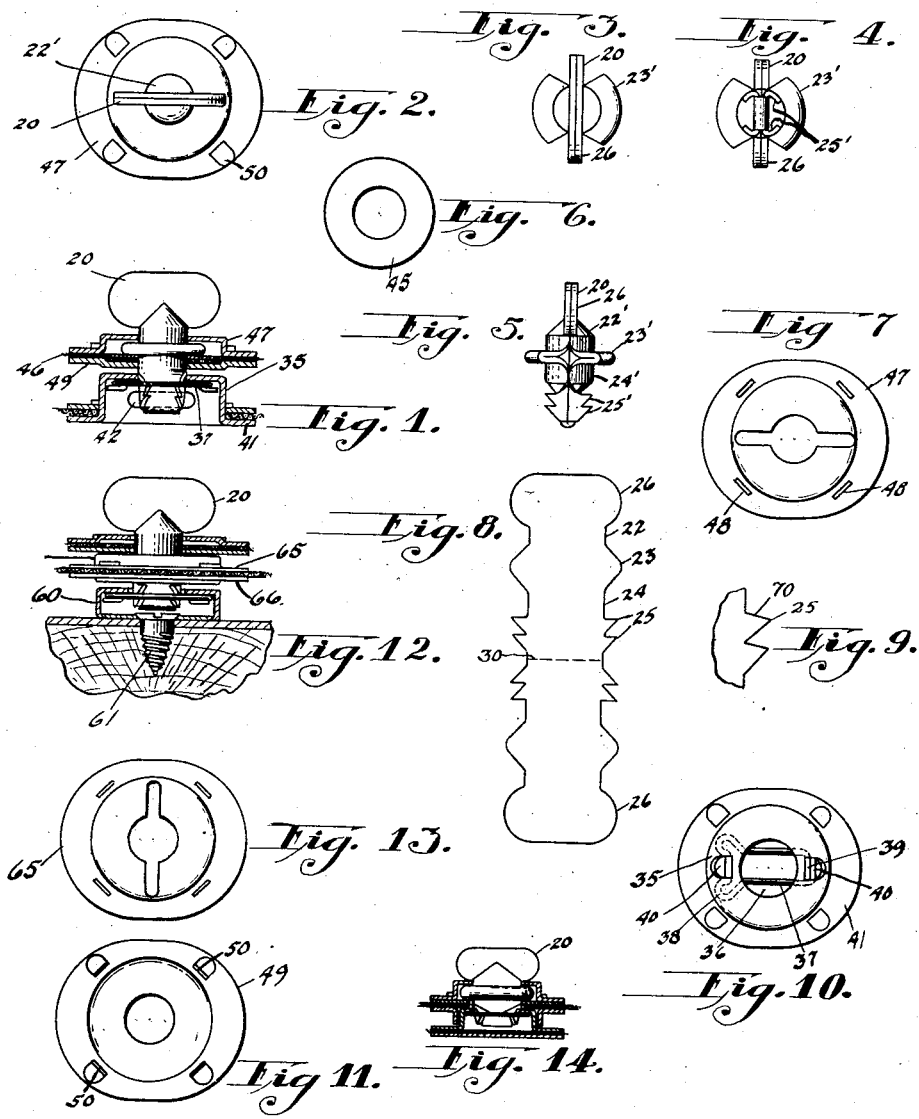
Witnesses:
R K Lee
P. H. Emrick
Inventor
Francis D. Hardesty Patented Jan. 3, 1928.

1,654,806

UNITED STATES PATENT OFFICE.

FRANCIS D. HARDESTY, OF DAYTON, OHIO.

SNAP FASTENER.

Application filed December 31, 1921. Serial No. 526,283.

The present invention relates to snap fasteners and particularly to such fasteners as are adapted for use in attaching vehicle curtains.

Among the objects of the invention are to provide positive locking of the parts of the fastener when in engagement and yet permit ready disengagement of the parts when desired.

Another object is to provide a fastener that permits easy engagement by snapping the parts together forming a positive lock, but which permits easy disengagement.

Still another object is to produce a fastener that will permit engagement of the parts only when the parts are in proper position.

Further objects and advantages of the present invention will be apparent from the following description, reference being had to the accompanying drawing, wherein a preferred embodiment of the present invention is clearly shown.

In the drawing:

Fig. 1 is a vertical section through the male and female members of the fastener with the male element in elevation.

Fig. 2 is a plan view of the fastener.

Fig. 3 is a plan view of the male element.

Fig. 4 is a view of the male element from underneath.

Fig. 5 is a side elevation of the male element.

Fig. 6 is a plan view of the bearing plate.

Fig. 7 is a plan view of the top plate of the male member.

Fig. 8 shows the approximate form of blank used in forming the male element.

Fig. 9 shows a fragmental view similar to Fig. 8 but showing a modified form of barb or tooth.

Fig. 10 is a plan view of the female member shown in Figs. 1 and 12.

Fig. 11 is a plan view of the bottom plate of the male member.

Fig. 12 shows the male member in elevation and a slightly different form of female member in vertical section and also shows in section what might be termed a "secondary" member.

Fig. 13 is a plan view of the top plate of the "secondary" member.

Fig. 14 is a view similar to Fig. 1 but showing a slightly modified form of fastener.

In the embodiment of the invention shown in the drawings a male element 20 is produced from a blank of the approximate form shown in Fig. 8. This blank is punched out of sheet metal and formed in one or more operations to produce an element such as is shown separately in Figs. 3, 4 and 5. In forming the blank the portion 22 between parts 23 and 26 is formed into semicircular section to form one half of that part of the post above the disc portion, the post being mainly cylindrical and merging into the flat wing portion above through an intermediate conical portion.

The portion 24 between part 23 and barbs 25 is formed similar to part 22 so that the post is in effect cylindrical below the wing portion and above the barbs 25, as indicated in Figs. 1 to 5 and 12. The portion 23 is formed into the flat bearing disc portion as shown at 23' and the barbs 25 turned back and formed to lie on the circumference of the cylindrical portion of the post as shown in Fig. 4.

The lower half of the blank is at the same time formed in a similar manner with the corresponding portions suitably shaped to make the other half of the male element when the blank is bent upon the line 30 as indicated in Figs. 4 and 5, the two suitably shaped ends 26 remaining flat and forming a wing portion for the male element.

It will be noted from Figs. 4 and 5 that the lower portion of the male element 20 presents the general form of a flattened rod with notches upon the flattened sides, the purpose of which will be described later.

Male member 20 is secured in operative relation to the curtain or other article to be fastened by the means shown in Figs. 1, 2, 6, 7 and 11.

The member 20 rests upon a bearing washer or plate 45 such as is shown in Fig. 6, which washer rests upon the fabric 46 of the curtain. A top plate 47 (see Fig. 7) is then placed over member 20, this plate being provided with slots 48. This assembly is then secured to fabric 46 by a plate 49 (see Fig. 11) upon the under side of the fabric 46, which plate is provided with tongues 50 adapted to penetrate the fabric and enter slots 48, being then clinched.

The female element shown in Figs. 1 and 10 consists of cupped disc 35 having a central perforation 36 and provided with a spring member 37 which may be of any suitable form and secured in suitable fashion to the under side of the member 35. In the present embodiment the spring 37 is of a single wire bent in the middle to give a substantial sized loop 38 and yet have the sides parallel, the ends being bent inwardly as at 39 and over-lapped. The spring 37 is then secured to member 35 by punching out ears 40 and bending the latter over the wire of the spring 37 as is clearly indicated in Fig. 10.

This form of female member is also provided with a flange 41 for the purpose of securing the member to the curtain or other article to be fastened and with an opening 42 for permitting drainage therefrom of any water collected from rain or elsewhere.

An alternative form of female member is shown in Fig. 12. In this form, instead of the flanged disc 35, there is used a cup 60 having a perforation in the bottom for allowing the passage of a screw 61 by which means the member may be secured to a base of wood or other material.

Further, in Fig. 9 is shown a modified form of tooth or barb. In this form, the tooth 25 is shown as being provided with a sloping or angular edge 70. The purpose of this is to cause ths spring 37 to exert a downward pull upon member 20 so as to automatically press the male member toward the female member when they are in locking position.

The operation of the fastener is thought to be more or less obvious from the description and only the following points will be mentioned.

In securing the two members together it will be sufficient to snap the lower end of post 20 into engagement with spring 37 in member 35, the two parallel parts of spring 37 dropping into the notch between the teeth 25 or above the uppermost pairs. This will result in a positive lock between the two and one that will not release itself.

Release of the two members may be accomplished by a quarter rotation of the post 20 and withdrawal from member 35. The quarter rotation of post 20 causes the spring 37 to be spread apart and the parallel parts thereof to ride upon the two sides of post 20 unprovided with notches, thus offering no resistance to its withdrawal.

Another point to be noted is that, in the preferred embodiment of the invention, the flattened lower end of post 20 is wider than the normal distance between the parallel parts of spring 37. This will prevent the insertion of post 20 into element 35 unless the former is in at least the approximate locking position. This feature is devised to prevent engagement of the two members in any position other than the locking position.

In cases where it is necessary or advisable to fasten an additional curtain with such fasteners the additional curtain may be provided with a top plate 65 such as that shown in Fig. 13 and a corresponding bottom plate 66 (not shown in detail) provided with suitable ears for securing the two to the fabric of the curtain. The latter will of course be suitably perforated. These plates will be perforated and slotted as in Fig. 13 so as to pass over the wing portion of post 20 and will be so positioned on the second curtain as to require the post 20 to be in release position when it is desired to secure the second curtain. The second curtain having been placed over the wing portion of post 20, the latter is turned to locking position and inserted into member 35 thus attaching both curtains to the element upon which member 35 is secured.

While the form of mechanism herein shown and described, constitutes a preferred form of embodiment of the present invention, it is to be understood that other forms might be adopted, all coming within the scope of the claims which follow.

What I claim is as follows:

1. A snap fastener comprising a male member and a female member, the male member being flattened and provided upon its flattened sides with means adapted to lock it within the female member, the female member being provided with cooperating locking means constructed and arranged to prevent entrance of the male member unless the latter is approximately in locking position.

2. A snap fastener comprising a male member and a female member, the male member being flattened and provided only upon its flattened sides with means adapted to lock it within the female member, the female member being provided with cooperating locking means constructed and arranged to prevent entrance of the male member unless the latter is approximately in locking position, the cooperating locking means being sufficiently resilient to permit rotation of the male member to a position in which the locking means cannot cooperate to lock the members together.

3. In a snap fastener, a male member comprising a revoluble post made from a flat metal blank, the post being formed with a cylindrical portion having a disc portion intermediate the ends thereof, the post also terminating at one end with a flattened portion and at the other end with a part having diametrically opposed teeth or notches on two sides thereof.

4. A male element for snap fasteners comprising a cylindrical portion, a disc like projection intermediate the ends thereof, the cylindrical portion terminating at one end in a wing portion and at the other end in a flattened part provided with teeth, the flattened part including the teeth lying wholly within an extension of the cylinder.

5. In a snap fastener, a male member comprising a revoluble post made from a flat metal blank, the post being formed with a cylindrical portion having a disc portion intermediate the ends thereof, the post also terminating at one end with a flattened portion and at the other end with a part having diametrically opposed teeth or notches on two sides thereof, and means providing bearing surfaces for the disc portion.

In testimony whereof I hereto affix my signature.

FRANCIS D. HARDESTY.